Aug. 21, 1962 R. J. BILLETT 3,050,174
CONVEYOR FOR ARRANGING ARTICLES IN SINGLE FILE
Filed Nov. 7, 1960 2 Sheets-Sheet 1
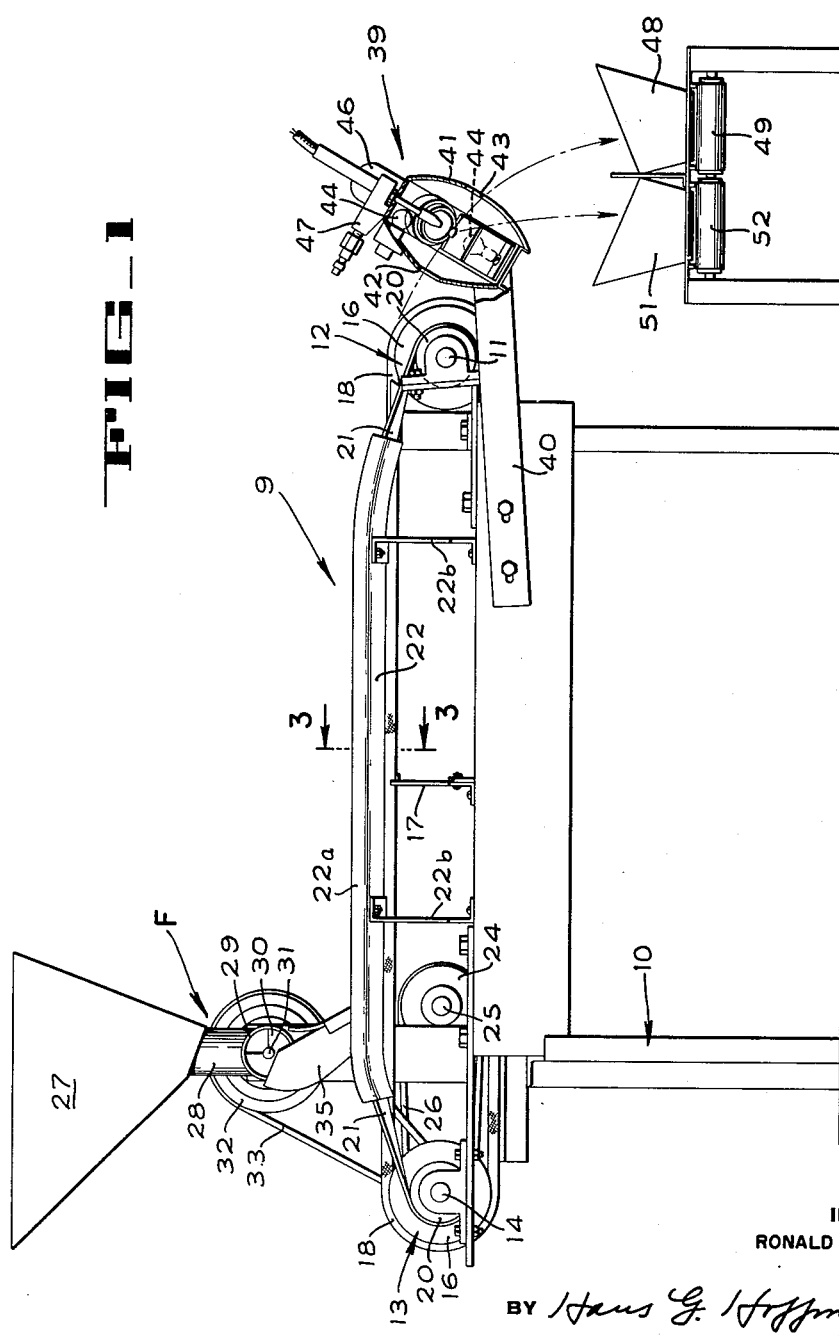
INVENTOR
RONALD J. BILLETT
BY Hans G. Hoffmeister.
ATTORNEY

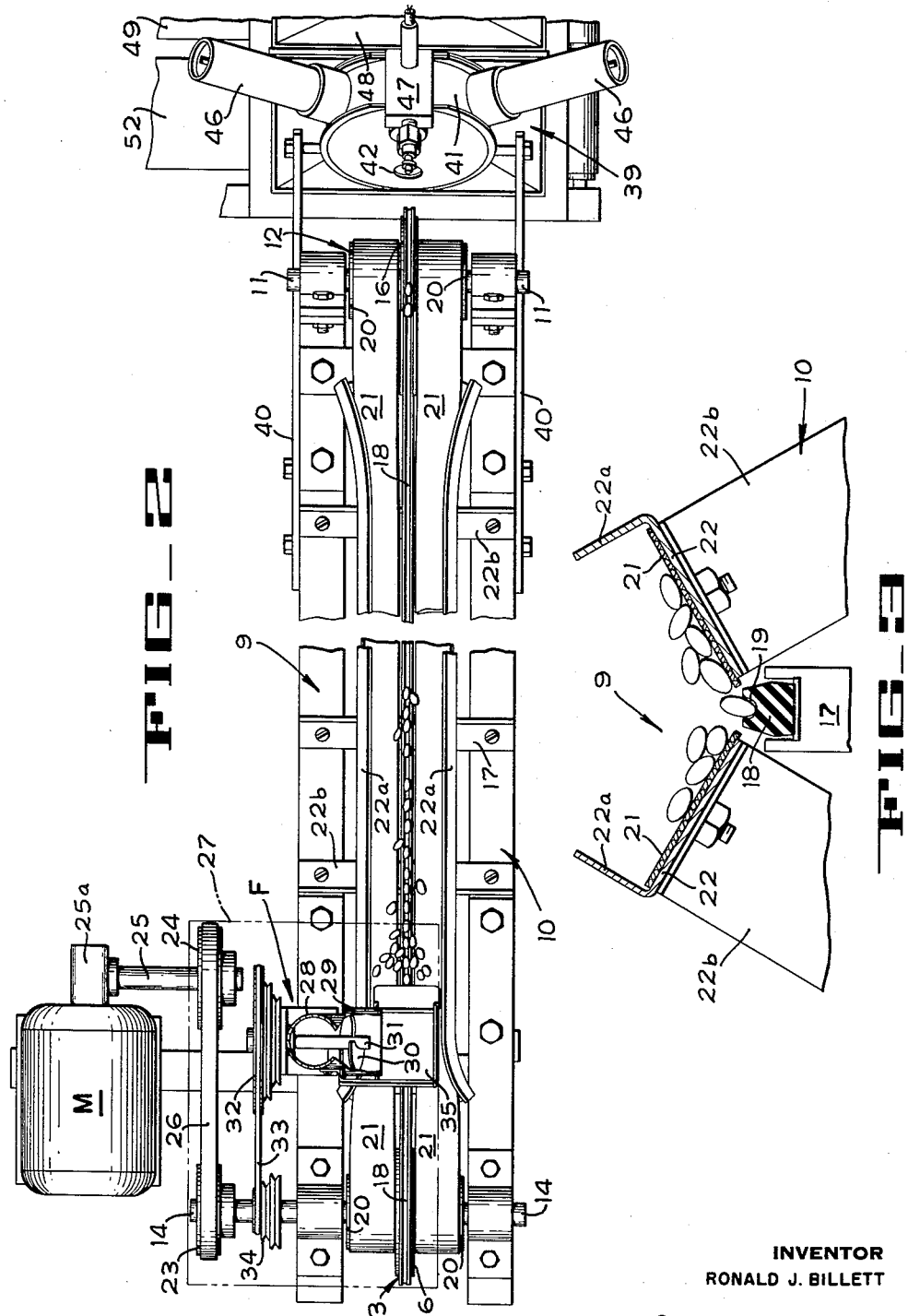

United States Patent Office 3,050,174
Patented Aug. 21, 1962

3,050,174
CONVEYOR FOR ARRANGING ARTICLES IN
SINGLE FILE
Ronald J. Billett, Santa Clara, Calif., assignor to FMC
Corporation, a corporation of Delaware
Filed Nov. 7, 1960, Ser. No. 67,759
4 Claims. (Cl. 198—30)

This invention relates to conveyors, and more specifically to conveyors adapted to arrange articles that are fed indiscriminately thereto into single file.

In the processing of certain articles such as beans, the articles are loosely fed from a hopper and conveyed from the feeding mechanism in single file to an inspection zone wherein they are directed one by one, across an inspection zone. As it passes through the inspection zone, the color characteristics of each individual bean is examined. In order to assure that each bean is examined in the same way and that the inspection is accurately carried out, it is very important that the trajectory of the beans is uniform.

An object of the present invention is to arrange articles of the type referred to in single file and transfer them to a zone wherein they can be discharged individually over a uniform trajectory for inspection purposes.

Another object is to provide an apparatus for conveying and discharging articles single file at a high speed.

Briefly, these objects are accomplished in the present invention by providing a conveyor having belts moving at different speeds. In general, the conveyor includes an article transporting belt which is substantially the same width as the articles to be conveyed in single file. Running parallel to a portion of the longitudinal extent of the upper reach of the article transporting belt, and disposed on each side thereof, are a pair of article delivery belts. The delivery belts are oppositely inclined and disposed on opposite sides of the transporting belt to form a trough.

A feeding mechanism deposits articles, such as beans, loosely in the trough and, since the article transporting belt is driven at a linear velocity that exceeds that of the article delivery belts, the articles seek an area of the article transporting belt that is free of beans. Thus, one by one the articles fall into place and into single file on the transporting belt. The transporting belt extends past the downstream end of the upper horizontal reaches of the delivery belts so that the articles are free of the delivery belts and can fall off the transporting belt at the pulley that defines the delivery end of the belt. This gives the articles a gravity influenced trajectory which is uniform for all articles and which can be used to pass the articles in front of a photo electric inspection station where they can be graded for color.

The manner in which these, and other objects of the invention can be accomplished will be apparent from the following detailed description.

In the drawings:

FIG. 1 is a side elevation of the apparatus of the invention.

FIG. 2 is a plan of the apparatus of FIG. 1.

FIG. 3 is a section along line 3—3 of FIG. 1, showing the relationship of the delivery and transporting belts.

The conveyor 9 of the invention is mounted on a frame 10, which includes means for rotatably mounting a shaft 11 that carries a composite pulley 12 at the delivery end of the conveyor. A duplicate pulley 13 is keyed on a shaft 14 at the other end of the conveyor. The pulleys 12 and 13 are identical and each pulley includes two side sections in the form of cylindrical drum-type pulleys and a midsection in the form of a V-belt pulley 16. At a midportion of the frame (FIG. 1) is an upstanding belt support and guiding plate 17, which is notched as seen in FIG. 3. Trained about the center pulley portion 16 of each pulley 12 and 13 and passing through the notch in plate 17 (FIG. 3) is a V-belt 18, the outer surface of which is formed with a concavity 19 to support the articles being conveyed. The V-belt 18 constitutes the article transporting belt of the conveyor. The upper reach of the article transporting V-belt 18 is substantially horizontal. The drum pulley 20 on each side of the midsection V-belt pulley 16 serves to drive a pair of article delivery belts 21 which are conventional flat belts.

The pulleys 16, that drive the V-belt 18 forming the article transporting belt, are of larger diameter than the cylindrical or drum pulleys 20 that drive the article delivery belts 21. This imparts a linear velocity to the article transporting V-belt 18 that is greater than the linear velocity of the delivery belts 21. As best seen in FIG. 3, the delivery belts 21 are maintained in an inclined position by guide strips 22 having article confining flanges 22a. Guide strips 22 are supported on the frame by brackets 22b. Thus, the upper reaches of the delivery belts 21 that are supported by the guide strips 22, form a V-shaped trough with the upper reach of the transporting belt 18 at the apex of the trough. As best seen in FIG. 1 the upper reach of the article transporting belt 18 extends to a zone that is longitudinally spaced from the upper reaches of the troughed portions of the delivery belts 21, that is, the portions of the belts 21 that are guided by guide strips 22.

The shaft 14 at the entrance end of the conveyor mounts a V-belt pulley 23 (FIG. 2) and a similar pulley 24 is mounted on a counter shaft 25 driven by drive motor M through a speed reducer 25a. A V-belt 26 connects pulleys 23 and 24 for driving the shaft 14 and the conveyor belts driven thereby.

A feeding mechanism F is provided for delivering articles such as beans to the delivery and article transporting belts. The feeder assembly F includes a hopper 27 connecting to a chute 28 leading to a transverse cylindrical tube 29. The hopper and part of the tube 29 have been broken away in FIG. 2. The articles are picked up by a feed screw 30 which is mounted in tube 29 and is driven by a shaft 31, a pulley 32, V-belt 33 and a second pulley 34, mounted on the driven shaft 14. Pulleys 32 and 34 are stepped to provide an adjustable feed. The screw 30 delivers articles to a discharge ramp 35 that feeds them by gravity to the belts.

Although the inspection station does not form part of the invention, means 39 for optically inspecting the articles for color are shown to indicate one use for the conveyor of the invention. Mounted on brackets 40 is a light housing 41 disposed at the discharge end of the article transporting belt 18. The housing is apertured at 42 to receive articles such as beans as they fall through their trajectory after leaving the belt 18. An exist slot 43 (FIG. 1) is also formed in the bottom wall of housing 41 so that the articles can pass through the housing.

The articles are illuminated by lamps 44 and are inspected by a pair of photo-electric devices 46, which may be photo-multiplier tubes. Articles that are of satisfactory color are permitted to maintain their original trajectory whereas those that are to be rejected are blown from their original trajectory by an air jet and valve mechanism 47 under control of an electric circuit (not shown) connected to the photo-multiplier tubes 46. As seen in FIG. 1, the accepted articles fall into a hopper 48 and are carried away by a belt 49. Rejected articles will be deflected from the normal trajectory by the air jet mechanism, with which they fall into a hopper 51 to be carried away by belt 52.

Thus, it can be seen that the apparatus of the invention is adapted to arrange articles in a single file at relatively high speeds. The lengths of the parallel reaches of the transporting belt 18 and the delivery belts 21 determine the speed with which the device can be operated. In one arrangement, when these reaches have a length of 20 inches, the transporting belt 18 can be driven at a speed of 200 feet per minute and the delivery belts 21 will be driven at a linear speed of 110 feet per minute. Once a set of belt speeds is selected, if the extent of the parallel reaches of the transporting and delivery belts is made long enough, the articles on belts 21 will always have time to hunt for a gap or a space between articles that have already positioned themselves on the transporting belt 18, so that all of the articles fed to the trough formed by the three belts will eventually be positioned in single file on the transporting belt 18, and very few articles will be carried away by the delivery belts 21 as they diverge from the transporting belt 18.

Although the articles are shown as being discharged so as to fall over a gravity trajectory for inspection purposes, in the broader aspect of the invention such inspection could take place while the articles are still on the transporting belt 18.

The invention having thus been described, that which is claimed as new and desired to be protected by Letters Patent is:

1. A conveyor for arranging a series of articles of substantially uniform size into single file, comprising an endless article transporting belt having a substantially horizontal upper reach, a pair of article delivery belts having upper reaches parallel to the upper reach of said article transporting belt, the upper reaches of said delivery belts being inclined from the horizontal to form a V-shaped trough with said transporting belt being at the apex of the trough, means for feeding the articles into the trough formed by said belts, spaced pulleys for entraining said belts, said article transporting belt extending longitudinally past the troughed portions of the upper reaches of said delivery belts the width of said article delivery belts substantially exceeding the maximum dimensions of the transported articles so that the delivery belts can fully support articles delivered thereto, that are parallel to said article transporting belt, the width of said article delivery belts substantially exceeding the maximum dimensions of the transported articles so that the delivery belts can fully support articles delivered thereto, the spacing between adjacent edges of the troughed portions of said delivery belts exceeding the maximum dimension of the articles so that the articles are deposited in single file on said article transporting belt and are transported to the delivery end of said transporting belt, whereupon said articles drop clear of said transporting belt at the delivery end of the belt and fall in a uniform trajectory, the angle of inclination of said delivery belts from the horizontal being sufficiently shallow to cause the belts to support the articles while they hunt for a gap between articles previously positioned on the transporting belt, means to drive said article transporting belt, and means to drive said delivery belts at a linear rate that is less than the linear rate of said transporting belt.

2. A conveyor for arranging a series of articles of substantially uniform size into single file comprising an endless article transporting belt having a substantially horizontal upper reach, the outer face of said article transporting belt being concave, a pair of article delivery belts having upper reaches parallel to the upper reach of said article transporting belt, the upper reaches of said delivery belts being inclined from the horizontal to form a V-shaped trough with said transporting belt being at the apex of the trough, means for feeding the articles into the trough formed by said belts, spaced pulleys for entraining said belts, said article transporting belt extending longitudinally past the troughed portions of said delivery belts that are parallel to said article transporting belt, the width of said article delivery belts substantially exceeding maximum dimensions of the transported articles so that the delivery belts can fully support articles delivered thereto, the spacing between adjacent edges of the troughed portions of said delivery belts exceeding the maximum dimension of the articles so that the articles are deposited in single file on said article transporting belt and are transported from a zone in between said delivery belts to a zone that is longitudinally spaced from the troughed portions of the delivery belts, whereupon said articles drop clear of said transporting belt at the delivery pulley of the belt and fall in a uniform trajectory, the angle of inclination of said delivery belts from the horizontal being sufficiently shallow to cause the belts to support the articles while they hunt for a gap between articles previously positioned on the transporting belt, means to drive said article transporting belt, and means to drive said delivery belts at a linear rate that is less than the linear rate of said transporting belt.

3. A conveyor for arranging a series of articles of substantially uniform size into single file, comprising an endless article transporting belt having a substantially horizontal upper reach, a pair of article delivery belts, a pair of spaced pulleys for said belts, each of said pulleys having a midsection for driving said article transporting belt and side sections of smaller diameter than that of said midsection for driving said delivery belts, means to drive one of said pulleys, guide means bringing the upper reaches of said delivery belts parallel to the upper reach of said article transporting belt, said guide means also causing the upper reaches of said delivery belts to be oppositely inclined from the horizontal to form a V-shaped trough with said transporting belt being at the apex of the trough, means for feeding articles into the trough formed by said belts, said article transporting belt extending longitudinally past the troughed portions of said delivery belts that are parallel to said article transporting belt, the width of said article delivery belts substantially exceeding the maximum dimensions of the transported articles so that the delivery belts can fully support articles delivered thereto, the spacing between adjacent edges of the troughed portions of said delivery belts exceeding the maximum dimension of the articles so that the articles are deposited in single file on said article transporting belt and are transported from a zone in between said delivery belts to a zone that is longitudinally spaced from the troughed portions of the delivery belts, whereupon the articles drop clear of said transporting belt at the delivery pulley of the belt and fall in a uniform trajectory, the angle of inclination of said delivery belts from the horizontal being sufficiently shallow to cause the belts to support the articles while they hunt for a gap between articles previously positioned on the transporting belt.

4. A conveyor for arranging a series of articles of substantially uniform size into single file comprising an endless article transporting belt having a substantially horizontal upper reach, a pair of article delivery belts having upper reaches parallel to the upper reach of said article transporting belt, the upper reaches of said delivery belts being inclined from the horizontal to form a V-shaped trough with said transporting belt being at the apex of the trough, means for feeding the articles into the trough formed by said belts, spaced pulleys for entraining said belts, said article transporting belt extending longitudinally past the troughed portions of said delivery belts that are parallel to said article transporting belt, the width of said article delivery belts substantially exceeding the maximum dimensions of the transported articles so that the delivery belts can fully support articles delivered thereto, the spacing between adjacent edges of the troughed portions of said delivery belts exceeding the maximum dimension of the articles so that the articles are deposited in single file on said article transporting belt and are transported from a zone in between said delivery belts to a zone that is longitudinally spaced from the troughed portions of the delivery belts, whereupon said articles drop clear of said transporting belt at the delivery pulley of the belt and fall in a uniform trajectory, means to drive said article transporting belt, means to drive said delivery belts at a linear rate that is less than the linear rate of said transporting belt, and means defining an inspection station at the delivery end of said transporting belt for inspecting the articles as they fall through their trajectory, the angle of inclination of said delivery belts from the horizontal being sufficiently shallow to cause the belts to support the articles while they hunt for a gap between articles previously positioned on the transporting belt.

References Cited in the file of this patent

UNITED STATES PATENTS

| | | |
|---|---|---|
| 2,763,359 | Rose | Sept. 18, 1956 |
| 2,862,606 | Schlichting | Dec. 2, 1958 |